United States Patent [19]

Baumann et al.

[11] 4,365,059
[45] Dec. 21, 1982

[54] NITRATION OF CELLULOSE

[75] Inventors: Robert P. Baumann, Mine Hill; Marcel Blais, Newton; Irwin Spiess, Pequannock, all of N.J.

[73] Assignee: The United States of America as represented by the Secretary of the Army, Washington, D.C.

[21] Appl. No.: 289,438

[22] Filed: Aug. 3, 1981

[51] Int. Cl.$^3$ .............................................. C08B 5/02
[52] U.S. Cl. ...................................................... 536/35
[58] Field of Search ............................. 536/30, 33, 35

[56] References Cited

U.S. PATENT DOCUMENTS

| 230,216 | 7/1880 | Arrault et al. | 536/35 |
| 1,780,151 | 11/1930 | Becker et al. | 536/35 |
| 2,536,285 | 1/1951 | Heckel et al. | 536/30 |

FOREIGN PATENT DOCUMENTS

| 557671 | 5/1958 | Canada | 536/35 |
| 563549 | 9/1958 | Canada | 536/35 |
| 2414925 | 10/1974 | Fed. Rep. of Germany | 536/35 |
| 1008720 | 5/1952 | France | 536/35 |
| 1156 | of 1914 | United Kingdom | 536/35 |
| 279036 | 3/1928 | United Kingdom | 536/30 |
| 376646 | 7/1932 | United Kingdom | 536/35 |

OTHER PUBLICATIONS

Cellulose-The Chemical That Grows-Haynes, Doubleday & Company, Inc., Garden City, New York, 1953, 1st Edition, pp. 45-50 & 55-60.

Primary Examiner—Ronald W. Griffin
Attorney, Agent, or Firm—Nathan Edelberg; Robert P. Gibson; A. Victor Erkkila

[57] ABSTRACT

There is disclosed a process for the nitration of cellulose with nitric acid in the absence of sulfuric acid which comprises adding sufficient nitric oxide and oxygen or air to the nitration reaction mixture to react with the water formed in the reaction. This regenerates nitric acid which can be recycled to the reaction or removed and collected.

7 Claims, 2 Drawing Figures

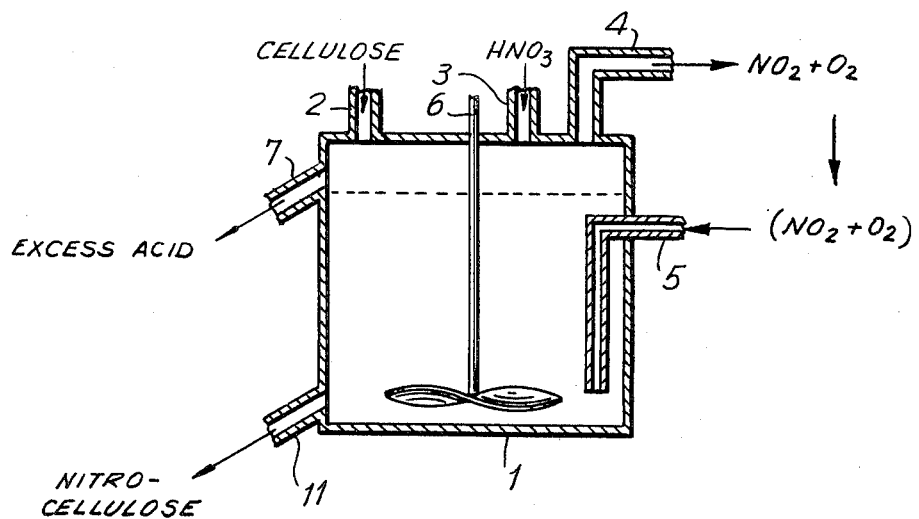
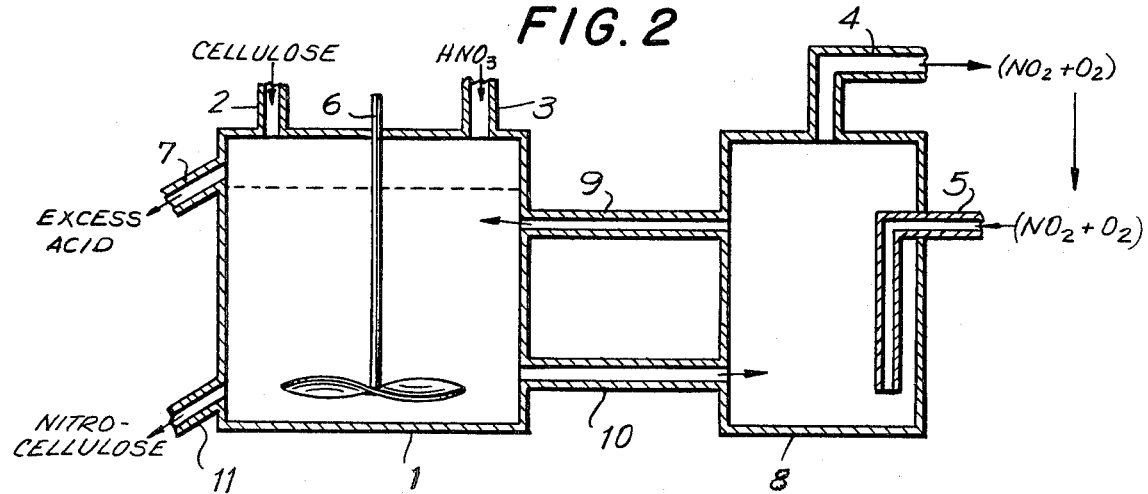

NITRATION OF CELLULOSE

GOVERNMENT RIGHTS

The invention described herein may be manufactured, used and licensed by the Government for Governmental purposes without the payment to us of any royalties thereon.

BACKGROUND OF THE INVENTION

Nitrocellulose, which is processed into various types of propellants and explosives, is manufactured from cellulose feed stocks consisting of fine fibers of cotton linters or macerated wood pulp.

In order to produce nitrocellulose, the cellulose feed stocks are treated with nitric acid to replace hydroxyl radicals in the cellulose structure with nitrate radicals. However, water is formed as a reaction product, and since the reaction is reversible, the water must be removed from the reaction site or the nitration reaction will not proceed to the desired degree. The nitration reaction can be written as follows:

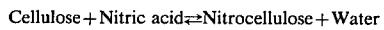

Cellulose + Nitric acid ⇌ Nitrocellulose + Water

Water heretofore has been removed from the reaction site by introducing sulfuric acid together with the nitric acid reactant into the reaction mixture. The sulfuric acid takes up the water, thus permitting the nitration of the cellulose to proceed. This process requires a purification and stabilization step to remove all traces of sulfuric acid. This is necessary because any sulfuric acid remaining in the product acts to break down the nitrocellulose resulting in degradation of the product. Heat and fumes may be evolved and explosion or fire may ultimately occur. The resulting product would not be suitable for processing into propellants or explosives with long shelf lives and critical performance and physical characteristics.

The required purification and stabilization of the nitrocellulose formed in the nitric acid-sulfuric acid reaction involve long boiling and washing operations which consume large quantities of heat, water, steam and electricity, requiring a large and costly facility and stringent quality controls. Although the resulting product may be satisfactory, the process is long and costly and large quantities of contaminated water are produced, causing pollution problems.

Efforts have been made to develop a process which eliminates the need for using sulfuric acid, with little success. One approach has been to use high concentrations of nitric acid so the water produced by the reaction is taken up in diluting the concentrated acid. This is not satisfactory because the dilution of the acid occurring near the cellulose surface causes the acid concentration to reach a point where the nitrocellulose dissolves and precipitates in crystalline form, causing the surface to harden. This is known as gelatinization and it makes the nitrocellulose unsuitable for processing into propellants.

If the concentration of the nitric acid is kept below the level where gelatinization takes place, the water produced in the nitration reaction reduces the concentration to the point where the reaction becomes reversible and the nitration reaction cannot proceed to the desired degree.

The above demonstrates that there is a need for a process, either continuous or batch, which will accomplish the nitration of cellulose by reaction of nitric acid and cellulose without the presence of sulfuric acid and which will provide for the economical elimination of water to produce a nitrocellulose which is homogeneous and suitable for use in propellants.

BRIEF DESCRIPTION OF THE INVENTION

This invention relates to a process for the production of nitrocellulose from cellulose by nitration of the cellulose with nitric acid and, in lieu of sulfuric acid to remove water formed in the reaction, removing the water by introducing nitric oxide ($NO_2$) gas and air or oxygen into the reaction mixture to form nitric acid. The nitric acid level is kept constant by adding the proper amount of $NO_2$ and oxygen ($O_2$). Any excess acid formed is either removed and collected or recirculated back into the reaction at a predetermined rate. The reaction can be carried out as a batch or continuous process.

In the batch process, the mixture of nitric oxide and air or oxygen is circulated directly into the nitration reactor to react with the water to form nitric acid. The excess nitric acid formed by the reaction of the $NO_2$, $O_2$ and water can be circulated into a secondary reactor where acid regeneration takes place.

In a continuous process, provision for continuous addition of the reactants at predetermined rates can be made. Any excess nitric acid regenerated can either be removed and collected or recirculated into a secondary reactor then back into the nitration reactor at a predetermined rate.

BRIEF DESCRIPTION OF THE DRAWINGS

FIG. 1 is a schematic representation of the apparatus and process of this invention; and FIG. 2 is a schematic representation of the apparatus wherein a secondary reactor is used.

DETAILED DESCRIPTION OF THE INVENTION

The present invention is based on the discovery that cellulose can be nitrated with nitric acid in either a batch or continuous process and a nitrocellulose product can be produced when nitric oxide ($NO_2$) and oxygen or air are introduced into the reactor to remove the water formed in the reaction by reacting therewith to form nitric acid. This prevents the water from diluting the nitric acid unduly which can dissolve and gelatinize the nitrocellulose product and also provides nitric acid for use in the process. In fact, the nitric acid level can be kept constant at a desired concentration by controlling the rate the $NO_2$ and air are introduced into the reactor.

The process of the invention thus eliminates the need for the use of sulfuric acid to take up the water. This is desirable because the sulfuric acid has undesirable effects on the product and process as discussed above.

The reactions involved in the process of this invention are as follows:

Reaction 1

$$C_6H_{10}O_5 + 3HNO_3 \rightarrow C_6H_7O_2(ONO_2)_3 + 3H_2O$$

and

Reaction 2

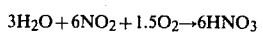

$$3H_2O + 6NO_2 + 1.5O_2 \rightarrow 6HNO_3$$

The above two reactions are simplified as follows:

$$C_6H_{10}O_5 + 1.5O_2 + 6NO_2 \rightarrow C_6H_7O_2(ONO_2)_3 + 3HNO_3$$

The cellulose can be in any convenient form to serve as a feedstock for the nitration reaction, such as for example, fine fibers of cotton linters or macerated wood pulp. The nitric acid used is commercial concentrated nitric acid, which may vary between about 80% and 100%, $HNO_3$, depending upon the degree of nitration desired, as is well known in the art. Advantageously the mole ratio of nitric acid to cellulose varies from about 50:1 to about 60:1. This keeps the concentration of the acid in the reactor sufficiently high to avoid dissolving the nitrocellulose product. However, since in the process of this invention, the nitric acid concentration will not be diluted by the water formed in the reaction, somewhat lower concentrations can be used, e.g. about 30:1 to about 50:1.

The amount of nitric oxide used is proportional to the quantity of the cellulose being nitrated. Thus, for each mole of cellulose being nitrated, 6 moles of nitric oxide and 1.5 moles of oxygen are needed to react with the three moles of water formed. This regeneration process produces 6 moles of nitric acid. Since only three moles of nitric acid are consumed in the process of nitrating cellulose, the excess nitric acid can be separated and either collected or recirculated.

The reason oxygen or air is required is that Reaction 2 takes place in two steps and the oxygen is required in the second step as follows:

Reaction 3

$$H_2O + 3NO_2 \rightarrow 2HNO_3 + NO$$

and

Reaction 4

$$NO + 0.5O_2 \rightarrow NO_2$$

The above two reactions are simplified as follows:

$$H_2O + 2NO_2 + 0.5O_2 \rightarrow 2HNO_3$$

As shown in FIG. 1, cellulose is introduced through feed line 2 into the reaction vessel 1, 6 moles of concentrated nitric acid for each mole of cellulose are also introduced into the reaction vessel 1 through feed line 3. The reaction mixture at 0° C. to 40° C. is mixed by stirrer 6 and nitric oxide and air are mixed and circulated into the reaction vessel 1 through inlet 5. Excess nitric oxide and air are vented through line 4 and recirculated to inlet 5. The flow rate of the gas mixture varies according to the nitration velocity of the cellulose which velocity varies with temperature. A temperature range of 0° C. to 40° C. is satisfactory for both the nitration and nitric acid regeneration. The gas flow rate, taking into consideration the temperature and acid concentration, should be sufficient to enable the gas to react with all the water as it is formed.

Excess nitric acid formed is removed through line 7 and the nitrocellulose product is recovered through outlet 11.

In a continuous process, which is generally preferred, predetermined amounts of cellulose are continually fed through feed line 2 into the reactor 1; however, once the initial amount of nitric acid is added, no more than minor amounts for adjustment of acid concentration are subsequently added because sufficient nitric acid is formed by the addition of nitric oxide and oxygen.

An alternate process and apparatus is depicted in FIG. 2, wherein the same reagents are introduced into the reactor 1 and mixed as described above. The diluted nitric acid from the reactor 1 is directed to a secondary reactor 8 through line 10 and increased in strength by the action of $NO_2 + O_2$ (Reaction 2) introduced through the inlet 5. Excess $NO_2$ and $O_2$ are vented through the line 4 and are recycled to the inlet 5. The regenerated strong nitric acid is returned to the reactor 1 through the line 9 for nitrating more cellulose. The excess nitric acid formed is removed through the outlet 7 and the nitrocellulose product is recovered through the outlet 11. Nitric acid inlet 3 is kept closed most of the time except at the beginning.

The reactions shown can be carried out either in a batch or continuous process. The continuous process is preferred since it is more convenient and economical.

This invention has been described with respect to certain preferred embodiments and modifications. Variations in the light thereof will be suggested to persons skilled in the art and are to be included within the spirit and purview of this application and the scope of the appended claims.

We claim:

1. A process for the production of nitrocellulose by the reaction of nitric acid and cellulose which comprises introducing into the reaction mixture containing concentrated nitric acid and cellulose, a mixture of nitric oxide and an oxygen containing gas to react with the water formed in the nitration reaction.

2. The process of claim 1 wherein the oxygen containing gas is air.

3. The process of claim 1 wherein for each mole of cellulose present in the reaction mixture, 6 moles of nitric oxide is introduced into the reaction mixture.

4. The process of claim 3 wherein for each mole of nitric oxide introduced into the reaction mixture, one fourth mole of oxygen is introduced.

5. The process of claim 1 wherein nitric acid is regenerated by the reaction of the nitric oxide and oxygen with the water and said nitric acid in amounts in excess of three moles per mole of cellulose present in the reaction mixture are recovered from the reactor.

6. The process of claims 1, 2, 3, 4 or 5 carried out in a batch reactor.

7. The process of claims 1, 2, 3, 4 or 5 carried out in a continuous reactor.

* * * * *